United States Patent
Welles et al.

(10) Patent No.: US 11,346,490 B2
(45) Date of Patent: May 31, 2022

(54) METAL PIPES WITH ANTICORROSIVE POLYOLEFIN COVERING LAYER

(71) Applicants: J. VAN BEUGEN BEHEER B.V., Hellevoetsluis (NL); BOREALIS AG, Vienna (AT)

(72) Inventors: Edwin Welles, San Antonio, TX (US); Leonard Van Beugen, Goudswaard (NL); Norbert Jansen, Wassenberg (DE)

(73) Assignees: WINN & COALES INTERNATIONAL LIMITED, London (GB); BOREALIS AG, Vienna (AT)

( * ) Notice: Subject to any disclaimer, the term of this patent is extended or adjusted under 35 U.S.C. 154(b) by 300 days.

(21) Appl. No.: 15/551,603

(22) PCT Filed: Feb. 17, 2016

(86) PCT No.: PCT/EP2016/053356
§ 371 (c)(1),
(2) Date: Aug. 17, 2017

(87) PCT Pub. No.: WO2016/131868
PCT Pub. Date: Aug. 25, 2016

(65) Prior Publication Data
US 2018/0038542 A1 Feb. 8, 2018

(30) Foreign Application Priority Data
Feb. 17, 2015 (EP) .................................. 15155467

(51) Int. Cl.
*F16L 58/16* (2006.01)
*B32B 27/32* (2006.01)
(Continued)

(52) U.S. Cl.
CPC ............... *F16L 58/16* (2013.01); *B32B 1/08* (2013.01); *B32B 7/12* (2013.01); *B32B 15/085* (2013.01); *B32B 27/08* (2013.01); *B32B 27/32* (2013.01); *C08K 3/36* (2013.01); *C08L 23/22* (2013.01); *C09D 5/08* (2013.01); *C09D 123/06* (2013.01); *C09D 123/10* (2013.01); *C09J 5/06* (2013.01); *C09J 7/00* (2013.01); *C09J 123/0815* (2013.01); *C09J 123/10* (2013.01); *F16L 58/109* (2013.01); *F16L 58/1045* (2013.01); *F16L 58/181* (2013.01); *B32B 2307/204* (2013.01); *B32B 2307/306* (2013.01); *B32B 2307/536* (2013.01); *B32B 2307/54* (2013.01); *B32B 2307/542* (2013.01); *B32B 2307/558* (2013.01);
(Continued)

(58) Field of Classification Search
CPC ............ C08L 23/22; C08K 2003/2227; C08K 2003/265; C08K 3/36; C09J 123/0815; C09J 123/10; C09J 123/06; C09J 123/20; C09J 2201/128; C09J 2400/166; C09J 2423/00; C09J 2423/04; C09J 2423/10; C09J 5/06; C09J 7/00; B32B 15/085; B32B 1/08; B32B 2307/204; B32B 2307/306; B32B 2307/536; B32B 2307/54; B32B 2307/542; B32B 2307/558; B32B 2307/584; B32B 2307/702; B32B 2307/71; B32B 2307/712; B32B 2307/714; B32B 2307/732; B32B 2307/752; B32B 2597/00; B32B 27/08; B32B 27/32; B32B 7/12; C09D 123/06; C09D 123/10; C09D 5/08; F16L 58/10; F16L 58/1045; F16L 58/109; F16L 58/16; F16L 58/181; F16L 9/02

See application file for complete search history.

(56) References Cited

U.S. PATENT DOCUMENTS 5,817,413 A   10/1998   Huddleston et al.
5,898,044 A    4/1999   Nooren
(Continued)

FOREIGN PATENT DOCUMENTS

CA      2308802 A1    11/2001
CN    102977719 A *    3/2013
(Continued)

OTHER PUBLICATIONS

English Abstract: Xiao et al. (CN 102977719).*

*Primary Examiner* — Holly Rickman
*Assistant Examiner* — Linda N Chau
(74) *Attorney, Agent, or Firm* — Hoyng Rokh Monegier B.V.; David P. Owen

(57) ABSTRACT

The present invention provides a metal pipe coated on at least a section of the metal pipe with a polyolefin coating system, wherein the system consists of the following layers: (a) optionally, a corrosion protective layer of a chromate, phosphate or other salt; (b) a polyolefin based adhesive, preferably in a thickness of 0.3-5 mm; (c) a PE or PP coating layer, preferably in a thickness of 1-10 mm; (d) optionally, an adhesion promoting layer between the polyolefin based adhesive and a PE or PP layer; wherein the polyolefin based adhesive contains an organic phase consisting of substantially saturated hydrocarbons, and wherein the adhesive contains amorphous polypropylene, ethylene-propylene copolymers or poly(iso)butylene (co)polymers, said adhesive being flowable when a pressure of 10 kgf/cm$^2$ is applied, wherein the PE or PP coating is a continuous layer over the coated section, and wherein said polyolefin based adhesive adheres to both the metal pipe and to said PE or PP coating.

8 Claims, 1 Drawing Sheet

(51) Int. Cl.
- *B32B 7/12* (2006.01)
- *B32B 15/085* (2006.01)
- *B32B 1/08* (2006.01)
- *C09D 123/06* (2006.01)
- *F16L 58/18* (2006.01)
- *B32B 27/08* (2006.01)
- *C09D 123/10* (2006.01)
- *C09J 123/08* (2006.01)
- *C09J 123/10* (2006.01)
- *C08L 23/22* (2006.01)
- *C08K 3/36* (2006.01)
- *C09D 5/08* (2006.01)
- *C09J 5/06* (2006.01)
- *C09J 7/00* (2018.01)
- *F16L 58/10* (2006.01)
- *C08K 3/22* (2006.01)
- *C08K 3/26* (2006.01)
- *C09J 123/06* (2006.01)
- *C09J 123/20* (2006.01)
- *F16L 9/02* (2006.01)

(52) U.S. Cl.
CPC ... *B32B 2307/584* (2013.01); *B32B 2307/702* (2013.01); *B32B 2307/71* (2013.01); *B32B 2307/712* (2013.01); *B32B 2307/714* (2013.01); *B32B 2307/732* (2013.01); *B32B 2307/752* (2013.01); *B32B 2597/00* (2013.01); *C08K 2003/2227* (2013.01); *C08K 2003/265* (2013.01); *C09J 123/06* (2013.01); *C09J 123/20* (2013.01); *C09J 2301/124* (2020.08); *C09J 2400/166* (2013.01); *C09J 2423/00* (2013.01); *C09J 2423/04* (2013.01); *C09J 2423/10* (2013.01); *F16L 9/02* (2013.01); *F16L 58/10* (2013.01)

(56) References Cited

U.S. PATENT DOCUMENTS

| | | | |
|---|---|---|---|
| 6,033,776 A | 7/2000 | Huddleston et al. | |
| 6,355,318 B1 | 3/2002 | Tailor et al. | |
| 6,465,547 B1 | 10/2002 | Jackson et al. | |
| 6,569,915 B1 | 5/2003 | Jackson et al. | |
| 6,589,346 B2 | 8/2003 | Schick et al. | |
| 6,794,453 B2 | 9/2004 | Jackson et al. | |
| 2003/0049402 A1* | 3/2003 | Sato | C09D 123/10 428/36.91 |
| 2004/0191515 A1 | 9/2004 | Mullen | |
| 2008/0305341 A1* | 12/2008 | Plieth | C09D 5/24 428/419 |
| 2011/0120587 A1* | 5/2011 | Anker | C09D 123/06 138/145 |
| 2012/0121894 A1* | 5/2012 | Welles | C09J 123/10 428/332 |
| 2014/0318686 A1* | 10/2014 | Nooren | F16L 58/10 156/86 |

FOREIGN PATENT DOCUMENTS

| | | |
|---|---|---|
| CN | 103602273 A | 2/2014 |
| EP | 319456 A2 | 6/1989 |
| EP | 0751198 A1 | 1/1997 |
| EP | 1174261 A1 | 1/2002 |
| EP | 1260547 A1 | 11/2002 |
| EP | 1801146 A1 | 6/2007 |
| EP | 2072589 A1 | 6/2009 |
| EP | 2081761 B1 | 3/2010 |
| EP | 2204427 A1 | 7/2010 |
| JP | 5187455 B1 | 4/2014 |
| WO | 00/52381 A1 | 9/2000 |
| WO | 2002/081105 A1 | 10/2002 |
| WO | 03/087205 A1 | 10/2003 |
| WO | 200832279 A1 | 11/2008 |
| WO | 2009080207 A1 | 7/2009 |
| WO | 2010/072802 A2 | 7/2010 |

* cited by examiner

Figures 1 A and B
Photographs 1A
Photograph 1B

METAL PIPES WITH ANTICORROSIVE POLYOLEFIN COVERING LAYER

The invention relates to metal pipes with an anti-corrosive polyolefin covering layer around said metal pipe, and a process for the preparation of the same.

More in particular, the present invention relates to a metal pipe with a polyolefin coating system, and a process for providing a metal pipe with a polyolefin coating system to protect the metal pipe against corrosion and other harmful and degrading effects and forces induced by the environment that impart the lifetime and operation of the pipe.

Furthermore, the present invention relates to the use of said polyolefin coating system for coating sections of pipes, such as field joints.

BACKGROUND OF THE INVENTION

Metal pipes such as a steel pipe properly coated with one or more layers of thermoplastic or thermosetting material is highly resistant to corrosion caused under corrosive surrounding conditions. For this reason, such coated metal pipe is employed in a wide variety of arts such as pipelines for supply of crude oil or natural gas, gas service pipes, and water service pipes. Particularly, the pipelines for the supply of crude oil or natural gas generally utilize coated steel pipes, because such pipelines are generally installed under severe surrounding conditions.

In the prior art many corrosion protective coating systems are disclosed. Common corrosion protecting systems comprise coating systems, comprising various layers of materials, shrink sleeves, and tapes, optionally provided with adhesive layers, and combinations of such systems.

In the art, a distinction is made between coatings that are applied in a factory (generally covering the largest part of a pipe), and coatings applied in the field on small sections which are not-coated because it is necessary to weld pipes together. The factory coated pipes are also called "pre-coated", mill-applied-coating and the like.

Commercial processes to produce pre-coated steel pipes are generally as follows: The surface of the steel pipes is cleaned by sandblasting. The steel pipe is then heated by induction heating to apply an optional corrosion protective layer, e.g. to apply chromates, phosphates and the like. A mandatory layer on the heated pipe is a primer, usually an epoxy coating. The epoxy coating is cured by the heat of the metal pipe, and is often called a "fusion bond epoxy". The application of epoxy coatings is a process that requires tight process controls. The epoxy coating is applied as a powder, which is an explosion hazard. Further, the quality of the epoxy coating is very dependent on the quality of cleaning (sand blasting and the removal of any dust), and e.g. of moisture in the air while applying the coating. Nevertheless, epoxy coatings are the industry standard for many years.

Further layers to improve the protection can be applied, e.g. polyolefin coatings of polyethylene or polypropylene of several millimeter thickness. This polyolefin layer generally needs an additional adhesive layers between the epoxy coating and the polyolefin layer.

US 2004/0191515 discloses a pipe coating for in particular subsea pipelines for the transportation of crude oil. Usually, such coatings consist of a protective epoxy-based coating that is applied on the steel pipe which is then covered with a marine concrete layer. The coating comprises a layer of polypropylene or polyethylene copolymer mixed with a polypropylene or polyethylene sintered material which is applied between the epoxy-based protective coating and the marine concrete layer to enhance shear resistance of the coating system.

U.S. Pat. Nos. 5,817,413 and 6,033,776 disclose a high shear pipeline tape comprising a backing material having on one surface thereof a rubber-based adhesive layer to be used on an epoxy-coated steel pipe.

U.S. Pat. No. 6,589,346 discusses the technical problems encountered with protecting steel pipes and tubing for underground installation against corrosion. The usual method involves sandblasting the surface of the steel pipe, coating said surface with an epoxy coating and covering it with a polyolefin jacketing material like HDPE or PP tape. By using a tape as jacketing material, wherein the tape is spirally wound around the pipes, weak joints may occur at the area of overlap and poor coverage of radial or longitudinal welding joints may be found. Furthermore, spirally wrapped jacketing material is said to cause poor low temperature adhesion of the epoxy coating to the pipe.

A number of other systems exist, such as polyurethane coated applied on the fusion bonded epoxy, or several types of tapes.

Apart from these industrial coated pipes (pipes with mill applied coatings, or factory-coated pipes), it is necessary to apply sleeves of coatings in the field, on the place where consecutive pipes are welded to each other (field joints or girth welds). Many systems are suggested to be used for such application.

WO 00/52381 discloses a shrink sleeve for sealing a welding joint of coated metal pipes, wherein between the end portions of the sleeve and the edges of the coating a sealant or an adhesive is applied. The adhesive may be a polyamide based hot melt adhesive formulation. The sealant is preferably a blend of atactic polypropylene and polyisobutene, optionally with a tackifier.

CA 2308802 discloses a heat-shrinkable polyolefin shrink sleeve that can be applied on the bare welding joints of polypropylene coated pipelines. Polypropylene coatings which usually consist of a combination of epoxy/adhesive/polypropylene, are used for high temperature pipelines. For applying such a heat-shrinkable polyolefin shrink sleeve to the welding joints of the polypropylene coated pipes, an adhesive is necessary to bond the end edges of the shrink sleeve to the end edges of the propylene coatings to ensure a proper seal.

U.S. Pat. No. 6,355,318 also discloses a shrink sleeve based system for protecting welding joints of pre-isolated pipes. In the field, pre-isolated pipes are connected by welding the service pipe that extends beyond the insulation material, where after the welded joint is insulated by applying a shrink sleeve. An important requirement of such a shrink sleeve as already explained above is that it provides a water-tight connection and mechanical protection to the insulation and therefore should adhere very well to the insulation as well as to the pipe. To that end, an adhesive composition is applied between the edges of the insulation material and of the shrink sleeve.

U.S. Pat. Nos. 6,465,547, 6,569,915 and 6,794,453 disclose coating or insulating crosslinked polypropylene compositions.

Another shrink sleeve system is disclosed in US 2004/0028862. In particular, this patent application is directed to joining and sealing overlapping edges of heat shrinkable polymeric wrap-around sleeves. Such sleeves comprise an outer layer of heat shrinkable polyolefin material and an inner layer of an adhesive, which adheres the sleeve to the substrate. The sleeve is wrapped around the welding joint of a pipeline, subsequently heated to cause shrinkage of the sleeve. Prior to the heat shrinking step, the overlapping edges of the sleeve are covered by a patch to prevent slippage of the overlapping ends during heat shrinking and subsequent creeping of the overlap joint.

A polyolefin adhesive is described in EP2081761. The adhesive can be applied on bare pipes, or on pipes coated with epoxy or polyolefins. Further, the adhesive may be covered with isobutylene/filler mixtures, which is applied as a tape, wherein the polyisobutylene/filler mixture is present on a polyethylene or polypropylene tape. Further possibilities suggested, are applying the adhesive on field joints, and further applying shrink sleeves.

A factory coating system, supplied under the trade name Stopaq® FAST comprises a primary coating, consisting of a cold-applied, non-crosslinked, non-crystalline, monolithic viscous polymer based, prefabricated wrap coating, and an outer layer provided on a tape, comprising an outer layer of a thick-walled, radiation-cross-linked, high density polyethylene, on an adhesive for providing mechanical protection.

A further factory coating system exists, supplied under the trade name Pritec® by Bredero Shaw, comprising a butyl rubber adhesive inner layer and a polyethylene extruded topcoat.

It is an object of the invention to provide a coating system that is easy to apply, and provides a coating system with very good properties.

It would furthermore be preferred that such system allows effective application of a coating system at field joints, i.e. coating sections of bare metal pipes in the field, while providing very good properties.

SUMMARY OF THE INVENTION

The present invention provides for a metal pipe coated on at least a section of the metal pipe with a polyolefin coating system, wherein the system consists of the following layers:
 a. optionally, a corrosion protective layer of a chromate, phosphate or other salt on the metal pipe;
 b. a polyolefin based adhesive, preferably in a thickness of 0.3 to 5 mm thickness;
 c. a PE or PP coating layer, preferably in a thickness of 1 to 10 mm thickness;
 d. optionally an adhesion promoting layer between the polyolefin based adhesive and a PE or PP layer;
 e. optionally further layers outside the PE or PP layer;
wherein the polyolefin based adhesive contains an organic phase consisting of substantially saturated hydrocarbons, and wherein the adhesive contains amorphous polypropylene, ethylene-propylene copolymers, or poly(iso)butylene (co)polymers, said adhesive being flowable when a pressure of 10 kgf/cm$^2$ is applied, wherein the PE or PP coating is a continuous layer over the coated part, and wherein said polyolefin based adhesive adheres to both the metal pipe and to said PE or PP coating.

The present invention furthermore provides a metal pipe coated on at least a section of the metal pipe with an anti-corrosive polyolefin covering layer around said metal pipe, wherein the metal pipe does not comprise an epoxy coating at the section where the anti-corrosive polyolefin coating is present, the metal pipe comprising
 a. optionally, a corrosion protective layer of a chromate, phosphate or other salt;
 b. a polyolefin based adhesive in direct contact with the metal and/or the corrosion protective layer, preferably in a thickness of 0.3 to 5 mm;
 c. a PE or PP coating layer, preferably in a thickness of 1 to 10 mm thickness;
 d. optionally an adhesion promoting layer between the polyolefin based adhesive and the PE or PP layer;
wherein the polyolefin based adhesive contains an organic phase consisting of substantially saturated hydrocarbons, and wherein the adhesive contains amorphous polypropylene, ethylene-propylene copolymers or poly(iso)butylene (co)polymers, said adhesive being flowable when a pressure of 10 kgf/cm$^2$ is applied, wherein the PE or PP coating is a continuous layer over the coated section, and wherein said polyolefin based adhesive adheres to both the metal pipe and to said PE or PP coating.

In one preferred embodiment, the polyolefin based adhesive consists essentially of an organic phase and inorganic phase, the organic phase comprising an amorphous polyolefin having a Ring & Ball softening point of between 75 and 180° C., and a second aliphatic material having a Tg of about −5° C. or lower and a kinematic viscosity of 4500 mm$^2$/s at 100° C. or less, wherein said organic components are present in weight amounts of between 95/5 and 10/90 (said polymer relative to said second material); the inorganic phase comprising a filler, the filler being present in amount of at least about 15 wt % in the total composition. This polyolefin based adhesive is visco-elastic under pressure, but does not flow when only light pressure is applied. The adhesive layer therefore does not have a tendency to sag or displace.

DETAILED DESCRIPTION OF THE INVENTION

The present invention provides for a metal pipe at least partly coated with a polyolefin coating system.

In one embodiment of the invention, the coating system consists of the following layers:
 a. optionally, a corrosion protective layer of a chromate, phosphate or other salt on the metal pipe;
 b. a polyolefin based adhesive, preferably with 0.3 to 5 mm thickness;
 c. a PE or PP coating layer, preferably in a thickness of 1 to 10 mm;
 d. optionally an adhesion promoting layer between the polyolefin based adhesive and a PE or PP layer;
 e. optionally further layers outside the PE or PP layer;

In another embodiment, the metal pipe is at least partly coated on a section of the metal pipe with an anti-corrosive polyolefin covering layer around said metal pipe, wherein the metal pipe does not comprise an epoxy coating at the section where the anti-corrosive polyolefin coating is present, the metal pipe comprising
 a. optionally, a corrosion protective layer of a chromate, phosphate or other salt;
 b. a polyolefin based adhesive in direct contact with the metal and/or the corrosion protective layer, preferably in 0.3 to 5 mm thickness;
 c. a PE or PP coating layer, preferably in a thickness of 1 to 10 mm;
 d. optionally an adhesion promoting layer between the polyolefin based adhesive and the PE or PP layer;

In both embodiments, the polyolefin based adhesive contains an organic phase consisting of substantially saturated hydrocarbons, and wherein the adhesive contains amorphous polypropylene, ethylene-propylene copolymers or poly(iso)butylene (co)polymers, is flowable when a pressure of 10 kgf/mm$^2$ is applied, the PE or PP coating layer is a continuous layer, and the polyolefin adhesive adheres to both the metal pipe and to said PE or PP coating.

In all embodiments, the polyolefin based adhesive is non-curable, i.e. it remains to have substantially the same physical properties over its lifetime of years. Hence, the flowability is present during the lifetime of the adhesive. To achieve such long lasting flowability, the polyolefin based adhesive should not be cross-linked, nor cross-linkable (under the natural conditions). Hence, adhesives based on butyl-rubber (98% butene, 2% isoprene) contain a substantial amount of polymer with about 2 mol % unsaturation if non-crosslinked. If non-crosslinked, the rubber will be fluid, but not stable over years. In case the butyl rubber is cross-linked, which it normally will be, then the adhesive will not be fluid.

The phrase 'consisting of substantially saturated hydrocarbons' means in the context of the present invention that the average unsaturation of the organic phase should be about 1 mol % or less, preferably about 0.5 mol % or less, and/or relative to the organic phase of the adhesive, about 1 equivalent of ethylenic unsaturation of less per a molecular weight of 5000, preferably, about 1 equivalent ethylenic unsaturation or less per a molecular weight of 10,000 (0.01 meq/g), and even more preferably about 1 equivalent ethylenic unsaturation or less per a molecular weight of 20,000, and even more preferably about 1 equivalent ethylenic unsaturation or less per 50,000 molecular weight (0.002 meq/g).

The polyolefin based adhesive is tacky under pressure, preferably, the polyolefin based adhesive is at 23° C. tacky to a substrate at least when the compound is pressed thereto. The compound can get an adhesion sufficient to have the material adhere to a surface and when adhered, the compound exhibits a cohesive failure.

A suitable test to determine tackiness, is—in analogy to EN 12068—as follows: a 25 cm long by 5 cm wide strip of material (1.4 to 2 mm thick) is pressed during 10 seconds to a clean steel plate with a 10 kg force per 1 cm$^2$, in such a way that no air is entrapped under the adhesive strip. Thereafter, the sample is stored for 24 hr at 23° C., and the compound is tested in a 90° peel test, for example with a tensile testing machine. The polyolefin based adhesive according to the present invention exhibits a cohesive failure, and part of the material stays adhered to the metal surface. Preferably, the polyolefin based adhesive is tacky at about 5 kg force per cm$^2$, and even more preferably at 2 kg force per cm$^2$.

In both embodiments, the polyolefin based adhesive preferably consists essentially of an organic phase and inorganic phase, the organic phase comprising an amorphous polyolefin having a Ring & Ball softening point of between 75 and 180° C., and a second aliphatic material having a Tg of about −5° C. or lower and a kinematic viscosity of 4500 mm$^2$/s at 100° C. or less, wherein said organic components are present in weight amounts of between 95/5 and 10/90 (said polymer relative to said second material); the inorganic phase comprising a filler, the filler being present in amount of at least about 15 wt % in the total composition.

The PE or PP coating is a continuous layer, which means that—on the section where the coating is applied—the PE or PP coating is heat-fusion bonded to itself (welding). This polyolefin coating imparts mechanical strength to the coating system, and therefore it is an advantage of the present invention that the mechanical properties are optimal because of the heat-fused polyolefin layer.

In order to achieve a continuous layer, the PE or PP coating preferably is extruded over the pipe section where the coating system of the present invention is applied. However, it is also possible to apply heated tapes that are wound over the pipe according to ISO NORM 21809-3 Part 5B and 5E. In this system, the PE or PP tapes are heated to such a temperature that the overlapping parts of the tapes are molten to each other. In contrast, cold applied tapes with a PP or PE film and an adhesive applied at temperatures below e.g. 50° C. are not continuous in the sense of the present invention, as the bonding between the PE or PP layers is via an adhesive.

The coating system of the present invention allows for an application of the adhesive and coating as a factory coating, at much lower temperature than normally possible with epoxy coatings. Heat hazards of metal pipes at 200° C., or explosion hazards because of the use of powdered epoxy are prevented, and the coating system according to the present invention is much less sensitive to application conditions than the commonly used fusion-bond epoxy systems. Furthermore, in use, the coating system has self-healing properties. It is a further advantage, in particular for PE coated pipes, that the coating is better resistant against UV, and therefore, such coated pipes have substantially better outdoor storage stability then epoxy coated pipes.

The coating system of the present invention allows for an application of the adhesive and coating as field joint coating. If applied in the field—which may be on-shore or off-shore—, covering field joints, the system allows for a highly automated system, with a very high quality coating, using less components, and/or being less hazardous than field joint coating systems used in the prior art. For example shrink sleeves are generally heated by open flame heaters. The coating system of the present invention obviates the need for such open flames.

The polyolefin based adhesive generally is present on the metal pipe in a thickness of between about 0.2 mm or more, and about 7 mm or less, preferably of about 0.3 mm or more and about 5 mm or less, preferably between 0.8 mm and 3 mm, and even more preferably about 2.5 mm or less.

The PE or PP coating layer preferably is present at a thickness between about 1 and about 10 mm, preferably between about 2 and about 5 mm. Smaller thickness as down to 0.5 mm, and larger up to 100 mm are equally possible, but less common.

Preferred thicknesses of the adhesive layer are preferably combined with preferred ranges of the PE or PP coating.

DESCRIPTION OF THE FIGURES

To test the self healing properties, a 6 mm diameter hole was made with a drill through a PE and adhesive layer which was applied with extrusion on a metal pipe. The metal pipe initially was visible. After about 20 hours, the hole was covered with the adhesive, and the pipe was protected against corrosion. Pictures of the damaged coating, and the self healed coating are shown as FIGS. 1A and 1B.

The Metal Pipe

Metal, or steel pipes are generally used in the gas and oil industry, or for transporting water. Generally, these pipes have an outer diameter between about 33.7 mm cm (25 mm (1 inch) internal diameter) to about 2540 mm (100 inch). Preferred are steel pipe diameters ranging from about 60.3 (2 inch) to about 1625 mm (60 inch).

The pipes can be coated on the inside, which coating is applied preferably before the coating on the outside of the pipe. However, application of the coating inside can also be done after applying the coating on the outside.

Before applying a coating, the metal pipe generally is sand-blasted to increase adhesion of the applied layer, and to obtain a cleanliness in accordance with ISO 8501. One of the advantages of the present invention is, that sandblasting is generally useful, but some residual iron oxide (rust) or the presence of some dust or salt particles is not detrimental to the corrosion resistance or the performance of the coating on the metal pipe. Hence, sandblasting may not be necessary, which is particular advantage in case the polyolefin coating system is used on field joints.

As disclosed further below, after sand-blasting, an anti-corrosive metal salt layer may be applied, although that is not necessary.

If an anticorrosive layer is present, it generally is present in a thickness of between about 1-1000 nanometer, preferably about 2-200 nm.

The anti-corrosive agent which may be used to form an anti-corrosive layer can be selected from known anti-corrosive agents for prevention of corrosion of metals such as iron or steel material. The anti-corrosive agent preferably is a metal salt. Examples of the anti-corrosive agent include metal salts of chromic acid (chromates) such as sodium chromate, potassium chromate, zinc chromate, magnesium chromate and chromium chromate; metal salts of phosphoric acid (phosphates) such as sodium dihydrogen phosphate, potassium dihydrogen phosphate, trisodium phosphate, tripotassium phosphate, magnesium hydrogen phosphate, and zinc phosphate; borates such as sodium borate, and potassium borate; nitrites such as sodium nitrite and potassium nitrite; and molybdates such as sodium molybdate.

The anticorrosive layer may be applied on the metal pipe by applying a solution in water, alcohol or the like, and drying the coating. Heat can be applied if necessary.

The metal pipe may be heated by induction heating to dry the metal pipe, and/or to keep the metal pipe at a temperature above the dew point of the moisture in the air. Generally, heating is sufficient to about 50° C. or less, preferably about 40° C. or less.

As is clear from the above, the metal pipe does not have an epoxy coating on the outside of the pipe at the section where the polyolefin coating system according to the present invention is present.

In case the polyolefin coating system is applied as a factory coating system, no epoxy coating is present on the outside of the metal pipe. Such coated pipe will have outer ends which are not coated, or where coating is removed before welding. The field joints may be any system available.

Generally, the pipes are coated over the full length in a factory, and the coating is thereafter removed at the end sections of the pipe (generally 10-30 cm) to allow to have a bare metal section to ensure that welding does not damage the coating. A simple way to be able to remove the coating at the end of pipes is to apply a Teflon film (after sand blasting but before coating), taped around the end of a pipe. The coating system can be easily removed from the pipe at the area where the Teflon tape is applied.

An advantage of the coating system of the present invention, in view of its self-healing, flowable properties, is that at a cut section of the coating system the adhesive is pressed a bit from under the PE or PP coating to the open site. Thereby, any ingress of moisture (that could cause disbondment of the coating and corrosion years later in the field) is prevented.

The low temperature at which the polyolefin coating system according the present invention can be applied in the factory is an advantage as it is possible to first coat the inner side of the pipe with a heat sensitive coating, and thereafter apply the outer coating, as heating of the metal pipe is not necessary to a temperature of over 60° C.

In case the polyolefin coating system according the present invention is applied as field joint, the metal pipe may comprise any available factory coating, including epoxy coating.

The Polyolefin Based Adhesive

The polyolefin based adhesive is applied directly on the metal pipe.

It is a distinct advantage of the present invention, that the metal pipe does not have to be heated to high temperatures, such as temperatures above 60° C. This is contrasted to the application of epoxy coatings on metal pipes, that require a temperature generally of above 150° C., and more specifically more than 180° C. Temperatures up to 240° C. can be used, although generally, the temperature is around about 200° C. when an epoxy coating is applied. The application of epoxy coatings has other drawbacks, such as the use of powder, which can be an explosion hazard (in particular with the hot pipes present). Also, the application of epoxy powder has to be done under precise controlled conditions, including low moisture.

The polyolefin based adhesive allows for very good adhesion, long term stability, self-healing characteristics, chemical resistance, and high impedance. The compound is therefore very suitable for use as adhesive. The polyolefin based adhesive has very low permeability for moisture or gas. Hence, the adhesive precludes water to form droplets on a metal surface, nor does it allow anaerobic bacteria to grow. The compound is therefore very suitable for use in anti-corrosive applications in the oil and gas pipeline industry.

The polyolefin based adhesive contains amorphous polypropylene or (iso)butylene polymers, which include copolymers, and the adhesive is flowable when a pressure of 10 $kgf/cm^2$ is applied. The adhesive is non-curable, i.e. it remains to have its flowable properties over its lifetime. The flowability can be obtained by a suitable choice of organic materials. The organic phase will largely consist of hydrocarbon materials, such as amorphous polymers that are soft, or fluid at room temperature. Tackifiers, and/or lower molecular compounds may be present. The organic compounds are generally low in residual ethylenic unsaturation to preclude crosslinking and/or degradation. Suitable polyolefin based adhesives are described in e.g. WO2010/072802, EP2081761 and EP0751198.

In one embodiment, the adhesive composition comprises polyisobutene or a blend of different polyisobutenes.

The glass transition temperature or glass transition temperatures of the polyisobutenes are preferably lower than −50° C. and more preferably lower than −60° C. The glass transition temperature or glass transition temperatures can be determined by differential scanning calorimetry (DSC) as is well known in the art.

The number average molecular weight Mn is preferably within the range of 5,000 to 1,000,000, more preferably within the range of 10,000 to 1,000,000 and in particular within the range of 10,000 to 900,000. The molecular weight distribution Mw/Mn of the polyisobutenes is preferably between 1 to 10, more preferably 1 to 5, even more preferably 1 to 4 and most preferably 1.5 to 3.5.

The number average molecular weight Mn of the polyisobutenes is determined by GPC for the lower molecular weights, e.g. up to about 100,000. For the higher number average molecular weights, they are determined by viscosity measurements (Staudinger Index $J_0$, formerly known as intrinsic viscosity), wherein the Staudinger Index is calculated from the flow time at 20° C. through capillary 1 of an Ubbelohde viscometer. The polyisobutenes to be used in the adhesive composition according to the present invention preferably have a Staudinger Index $J_0$ of 10 to 1500 cm$^3$/g, preferably of 20 to 1000 cm$^3$/g, as determined at 20° C.

The polyisobutenes have further preferably a surface tension of less than 40 mN/m at 20° C. The density of the polyisobutenes is preferably between 0.90 to 0.95 g/cm$^3$.

Preferred polyisobutenes are from the Oppanol series, in particular from the Oppanol B type.

The olefin polymer may further be is selected from copolymers of branched olefins, such as a polymer comprising more than 40 wt % of polymerized butene or isobutene and one or more linear or branched $C_2$-$C_{12}$ alkene different from the (iso)butane; a polymer comprising more than 40 wt % of propene and one or more linear or branched $C_2$-$C_{12}$ alkenes, different from propane, based on the total weight of the polymer; or a polymer comprising 5-90 wt % of 2-methyl-1-pentene and further linear or branched $C_2$-$C_{12}$ alkene, different from said 2-methyl-1-pentene, and mixtures thereof.

Preferably, the olefin polymer is uncrosslinked.

Examples of olefin polymers include polybutenes manufactured from a butene feed (such feeds comprise 1-butene and isobutene or 1-butene and small amounts of ethene, propene or other C4-C6 a-olefins), atactic polypropenes, ethene/propene copolymers, in particular those having a high propene content and poly(2-methyl-1-pentene)-copolymer.

Most preferably, the olefin polymer is selected from the group consisting of polybutene, atactic polypropylene, poly (2-methyl-1-pentene) and mixtures thereof.

The polybutene has preferably a melt index of 0.2-300 g/min (ISO 1133; 190° C., 2.16 kg), a density of 0.90-0.95 g/cm$^3$ (ISO 1183) and a melting point of 80°-135° C. according to DSC.

The poly(2-methyl-1-pentene) has preferably a melt index of 1-250 g/min (ASTM D 1236, 260° C., 5 kg), a softening point of 160°-200° C. (Vicat, ASTM D 1525) and a density of 0.82-0.85 g/cm$^3$ at 25° C.

The atactic polypropylene has preferably a number average molecular weight of 1,000-3,000 and a weight average molecular weight of 100,000-200,000. In the atactic polypropylene, the amount of $C_2$-$C_{10}$ α-olefin may be up to about 20 percent by weight, and is preferably between about 2 and about 10 percent by weight.

According to the invention, it is preferred that the olefin polymer has a glass transition temperature of less than –20° C., more preferably less than –30°. Certain polymers may have a glass transition temperature of less than –40° C. or less than –60° C., but this is not necessary for providing suitable coating systems. Additionally, it is preferred that the olefin polymer has a surface tension of less than 40 mN/m at 20° C.

The polymers described above can be mixed with tackifiers or low viscosity polymers, which are described below.

Furthermore, these polymers may be used in admixture with fillers as described below.

Furthermore, these polymers may be used in admixture with other additives as discussed below.

An adhesive composition according to the present invention, comprises:
(a) a polyisobutene having a glass transition temperature of less than –20° C. and surface tension of less than 40 mM/m at a temperature above the glass transition temperature of said polyisobutene,
(b) a filler material, and
(c) and optionally an anti-oxidant, wherein said anti-oxidant is selected from the group consisting of a primary and a secondary anti-oxidant.

In another embodiment of the present invention, the polyolefin based adhesive preferably consists essentially of an organic phase and inorganic phase, the organic phase comprises an amorphous polyolefin having a Ring & Ball softening point of between 75 and 180° C. and a second aliphatic material having a Tg of about –5° C. or less and a kinematic viscosity of 4500 mm$^2$/s at 100° C. or less, wherein said organic components are present in weight amounts of between 95/5 and 10/90 (polymer to second material); the inorganic phase comprising a filler, the filler being present in amount of at least about 15 wt % in the total composition.

It is thought, that because of the non-fluid character of the polymer of the composition of this preferred embodiment, the temperature characteristics with respect to resistance to flow at about 80° C. are substantially improved in comparison to a fluid polyisobutylene polymer.

A polyolefin based adhesive is for example described in EP2081761. This adhesive comprises a fluid polyisobutene polymer with a glass transition temperature below –40° C. and at most 10% filler materials. Although this material may be used in the present invention, it has disadvantages, in particular its behavior at elevated temperature can be insufficient because this adhesive exhibits a runny/dripping behavior at high temperature. This is a disadvantage because pipes for transport of deep well oil and gas near the well can be at a temperature of 70-85° C. Yet, at other places the coating tape needs to be effective at ambient temperature in the ground, but also at high and low (between 50° C. and –40° C.) temperatures at places where the oil pipes are above the ground surface or when the coating tape is used to coat man-hole covers.

A polyolefin based adhesive, very suitable in the present invention is described in WO2010/072802.

The polyolefin based adhesive is at 23° C. tacky to a substrate at least when the compound is pressed thereto. The compound can get an adhesion sufficient to have the material adhere to a surface and when adhered, the compound exhibits a cohesive failure.

A suitable test to determine tackiness, is—in analogy to EN 12068—as follows: a 25 cm long by 5 cm wide strip of material (1.4 to 2 mm thick) is pressed during 10 seconds to a clean steel plate with a 10 kg force per 1 cm$^2$, in such a way that no air is entrapped under the adhesive strip. Thereafter, the sample is stored for 24 hr at 23° C., and the compound is tested in a 90° peel test, for example with a tensile testing machine. The polyolefin based adhesive according to the present invention exhibits a cohesive failure, and part of the material stays adhered to the metal surface. Preferably, the polyolefin based adhesive is tacky at about 5 kg force per cm$^2$, and even more preferably at 2 kg force per cm$^2$.

Generally, the polyolefin based adhesive has pressure sensitive adhesive characteristics if about 50 wt % or less second aliphatic material is present in the organic phase. The pressure sensitive character is a clear advantage over compositions with fluid polymers, as the compositions with fluid polymers always flow, or are runny, also if not needed.

The polyolefin based adhesive is flexible at room temperature (23° C.). The compound generally has a Tg of about –10° C. or less, more preferably about –20° C. or less, and even more preferably about –30° C. or less.

The Tg can be measured in a rheometer (like for example Physica MCR 301), with a PP 8 (plate/plate geometry of 8 mm diameter, with 1 mm layer of material) and a heating rate of 2° C./min; with a 0.001% deformation and a frequency of 10 rad/s). The temperature at which G" shows a peak can be considered as the Tg. Generally, comparable results are obtained with a DSC or DMA. Some materials show more than one peak; generally, the Tg is the peak at the lowest temperature in the spectrum; a man skilled in the art knows which peak is considered the glass transition temperature.

An advantage of the polyolefin based adhesive is its strength at high temperature. A parameter that is indicative for the high temperature flow behavior or strength is the yield point. A suitable way of measuring the yield point is in a plate-plate rheometer (as described above), in a measurement at elevated temperature (for example 90° C.), with a variable, increasing amplitude, and determining when G' equals G". Polyisobutene materials appear to show a yield point at deformation lower than 1% in a constant frequency sweep (10 rad/s) at 90° C. with increasing amplitude, whereas the compounds of the present invention generally exhibited a yield point at more than 1% deformation, preferably at about 2% or higher, and even more preferably at about 5% or higher, and may be even about 10% or higher.

In an alternative way, rheological properties were determined on a TA Instruments AR, with a temperature unit and a plate/plate measuring system with a spindle of 4.1 cm (1.6 inch) diameter. The distance between the plates was in this case 4 mm. With such thicker layer of material the bulk properties seem to be measured in a more direct way. At 71° C., the polyisobutylene based materials did have a yield point below 0.01% deformation, whereas the polyolefin based adhesive showed yield points above 1%. In a preferred embodiment, the materials of the present invention exhibit a yield point at 71° C. of about 0.1% deformation or higher, preferably at about 0.5% or higher, and most preferably at about 1% or higher, if measured in a rheometer with 4 mm plate distance and a 4.1 (1.6 inch) diameter spindle. Temperature sweeps were measured with a strain of 0.005% and an angular frequency of 6.3 Hz over a temperature range of 5 to 90° C. A material based on high molecular weight polyisobutylene and filler material exhibited at this very low strain level, at about 35° C. a G' equaling G". At a temperature above about 35° C., G' appeared to be lower than G", meaning that the material behaves as a fluid. In contrast, the polyolefin based adhesive exhibit—at this stress level— always a G'>G"; meaning that this material behaves as a solid.

The polyolefin based adhesive exhibits besides the good high temperature characteristics also good tack and adhesive strength. The adhesive strength of the polyolefin based adhesive, because of the well balanced components, is such that a cohesive failure is observed.

The amorphous polyolefin generally is an ethene, propene or butene or higher alkene based polymer. The polyolefin can be a homo-polymer, co-polymer or mixtures of these. Copolymers include polymers from two, three or more monomers, and may be block-co-polymers and/or random copolymers.

Preferred polymers or copolymers are butene or propene-based and preferably comprise about 30 wt % or more propene or butene polymerized units.

Suitable butene based (co)polymers include polyethene-butene, polypropene-butene, polyethylene-isobutene, polyethene-propene-butene, polypropene-butene-hexene and the like.

In a particularly preferred embodiment, an amorphous propene based (co)polymer is used as amorphous polyolefin. Such amorphous propene based (co)polymer may be a-tactic polypropylene, co/terpolymers of propylene with other α-olefins having 2 to 10 carbon atoms, preferably 2 to 8 carbon atoms, including ethylene, 1-butene, 4-methyl-1-pentene, 1-hexene, 1-heptene, 1-octene and the like. Such copolymers are known in the art, and have rubbery characteristics at room temperature.

In a preferred embodiment, a PEPP copolymer is used; such PEPP copolymers may be random copolymers or block-copolymers, and preferably is a random copolymer. The amorphous propylene based polymer generally contains about 40 wt % of propene or more, and even more preferably about 60 wt % or more. Generally, the copolymers comprise about 90 wt % or more ethylene and propylene units, preferably about 95 wt % or more, and even more preferably about 98 wt % or more. Other monomer units preferably are C4 or higher ethylenically unsaturated compounds, like for example α,n-butene, isobutene, α,n-hexene, or α,n-octene. Such PEPP copolymers are known in the art, and commercially available.

In another preferred embodiment, an amorphous polypropylene is used, having about 10 mole % or less comonomers, preferably about 5 mole % or less, and the polypropylene may have substantially no other monomer copolymerized.

Suitable polyolefins include polymers with a melting point (measured as a R&B softening point) of about 75° C. or higher, preferably about 100° C. or higher, and even more preferable 110° C. or higher. The R&B softening point of the polymers generally will be about 180° C. or lower, preferably 160° C. or lower. The ring and ball softening point can be measured according to ASTM E28.

The Tg of the amorphous polyolefin preferably is about −5° C. or lower, preferably −10° C. or more, and even more preferably about −20° C. or lower.

Generally, the polymers will have a Brookfield viscosity according to ASTM D3236 at 190° C. of about 20 cP or higher, preferably about 200 cP or higher. Preferably, the viscosity will be about 40,000 cP or lower, more preferably about 10,000 cP or lower.

Preferably, the average molecular weight (Mn in g/mol, as measured with high-temperature SEC calibrated with PE-standards; solvent trichlorobenzene; temperature 140° C.; refractive index detector) generally will be about 1,000 or higher, preferably about 2,000 or higher, and about 100,000 or lower, preferably about 50,000 or lower, and even more preferred about 30,000 or lower. A too low molecular weight may diminish the high temperature characteristics. A too high molecular weight may cause a lower tack. However, the molecular weight suitable in certain compositions will depend on the type and/or the amount of polymer, second aliphatic material and the optional other materials and may vary.

Preferably, the neat polyolefin exhibits a penetration depth of about 10.0 mm or less, preferably about 5.0 mm or less at 25° C. This hardness secures a sufficient strength of the composition of the present invention. The penetration depth is measured according to ASTM D5, which gives the depth in dmm, (tenth of a mm). The most common conditions are 100 g penetrating for 5 seconds at a temperature of 25° C. with a standard Needle of 50.8 mm length by 1 mm diameter. Generally, the penetration depth is about 0.1 mm or more, preferably about 0.3 mm or more, and even more preferably about 0.7 mm or more, as the polymer preferably is sufficiently soft to serve as a suitable base material for the adhesive compound.

The surface tension of such polyolefins is generally about 22-36 mN/m, preferably about 25 mN/m or more, and preferably about 33 mN/m or less (sessile drop technique using diiodomethane as probe liquid at 20° C.).

The term amorphous is used to describe the macroscopic behavior of the polyolefins; the polyolefin may show microcrystallinity. The polyolefin can be considered amorphous if the polymer, cooled from the melt without shear or stress applied, exhibits a degree of crystallinity of about 15% or less, preferably about 10% or less, and most preferably about 5% or less crystallinity, deduced from a DSC run at a heating rate of 10° C. per minute with reference values taken from the ATHAS database.

Suitable copolymers include Eastoflex® polymers from Eastman Chemical, such as for example Eastoflex® E1003, E1060 or E1200, Vestoplast® polymers from Evonik Degussa, such as for example Vestoplast® 408, 608, 703 or 750, or Rextac® polymers from Huntsman, such as for example Rextac® RT 2730, RT 3535, RT 3585, RT 4460. Suitable amorphous propylene polymers include Eastoflex® P1010 and P1023 or Rextac® RT 2115, RT 2180, and RT 3180, or Polytac R500 from Crowley Chemicals.

The second component of the organic phase is an aliphatic material. Aliphatic in this invention comprises linear, branched and/or cycloaliphatic. It is preferred that the second aliphatic material is predominantly linear or branched as such material may have a lower Tg.

The second aliphatic material has a Tg of about −5° C. or less, preferably about −20° C. or less, and even more preferred about −30° C. or less. The Tg can be measured as described above.

This second aliphatic material generally is a fluid or semicrystalline waxy solid at room temperature. The second aliphatic material acts as a tackyfier Generally, the molecular weight of this material is about 3000 or less, preferably about 2500 g/mol or less, and more preferably 1500 g/mol or less, preferably 800 g/mol or less. Generally, the molecular weight will be about 100 g/mol or more, preferably about 200 g/mol or more. If the molecules are mainly linear, generally the molecular weight will be in the lower range. If branched or star like, such as oligomers of butene, isobutene or other branched polyolefins, the average molecular weight can be higher, like between 2000 and 2500 dalton. In case the second compound is a mixture of materials, the average molecular weight confers with the values described above, and the polydispersity of each single material is generally about 5 or less, and preferably about 3 or lower.

Generally, this material in substantially pure form is molten at 70° C., and will have a kinematic viscosity at 100° C. of about 4500 mm$^2$/s or lower, preferably about 3000 or lower, and more preferably about 700 mm$^2$/s or lower for oligomeric compounds, and of about 120 mm$^2$/s or lower, preferably of about 70 mm$^2$/s or lower for lower molecular weight compounds. The kinematic viscosity can be measured according to DIN 51562. Exemplary kinematic viscosities of Vaseline and of plasticizer oils at 100° C. are in the range of 10 to 15 mm$^2$/s or lower; tackifier resins may show a kinematic viscosity in the range of 30-70 mm$^2$/s. Oligomers, or low molecular weight polymers of butene or isobutene may have kinematic viscosities up to 4500 mm$^2$/s or less, preferably about 3000 or less, and more preferably about 700 mm$^2$/s or less Generally, the second aliphatic material will exhibit a largely Newtonian fluid behaviour. Hence, such compound (in substantially pure form) will not comprise higher molecular weight compounds that would cause the fluid behaviour to become elastic.

In one preferred embodiment of the invention, the second aliphatic material is a polybutene oligomer or polymer. Polybutene is a viscous copolymer of butene and isobutene monomers. "Polybutene", as used herein, refers to both hydrogenated (CAS #68937-10-0) and unhydrogenated (CAS #9003-29-6) forms of the polymer. Polybutene is a viscous, colorless, non-drying, liquid polymer. Preferably, hydrogenated oligomers/polymers are used.

The second aliphatic compound is different from the amorphous polyolefin, thus the compound of the present invention contains at least two different materials in the organic phase. Generally, the amorphous polyolefin has a higher viscosity at 100° C. than the second aliphatic material. Furthermore, the second aliphatic material will generally exhibit a lower molecular weight than the polyolefin.

Preferably, the amorphous polyolefin and the second aliphatic material both have about the same surface tension. This means that the surface tension is sufficiently similar that stable mixtures are obtained, and that no phase separation is observed or expected within a several years of use. More preferably, the amorphous polyolefin and second aliphatic material have such a surface tension that mixtures of these materials at the targeted mixture ratios do not show visible (by the naked eye) phase separation when kept for one month at 100° C.

Preferably, the second aliphatic material has a surface tension of about 22-36 mN/m, and more preferably about 25 mN/m or higher, and preferably about 33 mN/m or lower.

Preferably, the difference between the surface tension of the polymer and the aliphatic compound is about 7 mN/m or less, more preferably, 5 mN/m or less, and even more preferably 3 mN/m or less.

In one preferred embodiment, the second aliphatic material is substantially purely aliphatic or cycloaliphatic. Preferably, the amount of olefinic and/or aromatic groups is low; the amount of olefinic and/or aromatic groups preferably is about 3 mol % or lower, preferably about 2 mol % or lower. Furthermore, the material preferably does not contain oxygen or nitrogen heteroatoms, hence, the amount of these heteroatoms will be about 2 mol % or lower.

Suitable second aliphatic materials include wax, purified oil fractions, synthetic oils, paraffinic white oils, white petrolatum and the like. Further suitable materials include low molecular weight polyisobutene, polybutene and low molecular weight resins made by copolymerizing and hydrogenating lower (C4-C8) diolefins with lower (C4-C8) monoolefins or polymerizing and hydrogenating cyclodiolefins, and the like. Suitable examples include Penreco® Snow, Penreco® Super, Penreco® Ultima, Penreco® Regent, oil HB 40, Primol® 352, 382, 542 from Exxon, Ondina® 15, 32, 46, 68 from Shell, Wingtack® 10 from Cray Valley, Piccotac® 1020-E, Regalrez® 1018, Regalite® 1010 from Eastman Chemical, Escorez® 2520 from Exxon Mobil and Durasyn 180 or Durasyn R from Ineos.

Suitable polybutenes for use herein include, but are not limited to: Indopol L-14, Molecular Weight ("MW")=370; Indopol L-50, MW=455; Indopol L-65, MW=435; Indopol L-100, MW=510, H-15, MW=600; H-25, MW=670; H-35, MW=725; H-40, MW=750; H-50, MW=815; H-100, MW=940; H-300, MW=1330; H-1500, MW=2145; H-1900, MW=2270; Panalane L-14E, MW=370; Panalane H-300E, MW=1330; all trade names of BP Amoco Chemicals (Chicago, Ill.). Other suitable grades of polybutene include Parapol 450, MW=420; Parapol 700, MW=700; Parapol 950, MW=950; Parapol 1300, MW=1300; and Parapol 2500, MW=2700; all trade names of ExxonMobil Corporation.

The organic phase may further comprise one or more antioxidants, coloring agents, other polymers or oligomers, bitumen, clarifying/nucleating/antistatic agents, flame retardants, acid scavengers, compatibilizers, other plasticizers and the like.

Suitable antioxidants include phenolic antioxidants, phosphites, lactones, thioesters, hydoxylamines, hindered amine light stabilizers (HALS) and other stabilizers.

The amount of the one or more anti-oxidant (relative to the organic phase) may vary, and can be about 4 wt % or less, and is preferably about 2 wt % or less. Suitable amounts may be 0.05 wt % or more, and more preferably between 0.1-1.8 wt %.

In one embodiment, the composition comprises at least one primary antioxidant. A preferred primary antioxidant comprises sterically hindered phenol groups. Suitable sterically hindered phenol compounds are selected from the group consisting of for example Irganox® 1076, Irganox® 1098, Irganox® 1035, Irganox® 1330, Irganox® 1010, Irganox® 3114, Irganox® 245, Irganox® MD 1024, Irganox® 259, Irganox® 3125 and the like. Instead of or in addition to the sterically hindered phenols, sterically hindered alkylthiomethylphenols or arylthiomethylphenols such as Irganox® 1520 or Irganox® 1726 may be used.

In another preferred embodiment, the composition comprises a mixture of primary and secondary antioxidants.

Suitable secondary antioxidants include phosphites and thioesters. According to the invention, suitable phosphites are Irgafos® P-EPQ, Irgafos® 12, Irgafos® 168, Irgafos® 38, Irgafos® 126 and the like. Suitable thioesters may be selected from compounds such as Irganox® PS 800, Irganox® PS 802 and the like.

In another preferred embodiment, the composition comprises a mixture of phenolic-type primary antioxidants phosphite-type secondary antioxidants and lactone-based antioxidants. Such mixtures are known in the art, and commercially available, e. g., as Irganox® HP or Irganox® XP blends from Ciba.

In another preferred embodiment, in addition to primary and/or secondary anti-oxidants, sterically hindered amines may be included in the composition. Suitable sterically hindered amines may be selected from compounds such as Chemassorb® 2020, Chemassorb® 944, Chemassorb® 119 and the like.

In yet another preferred embodiment, no antioxidants are added or used. This may be preferred for costs reasons, and may be possible when mixing of the components is performed at reasonable low temperature.

Suitable coloring agents include dyes that are soluble in the organic phase such as for example phthalocyanine pigments. Such dyes may be present in a suitable amount to impart sufficient color. Preferably, the amount is about 0.2 to 4 wt % with respect to the organic phase.

The organic phase may further comprise polymeric or oligomeric compounds such as tackifiers, rubbers, polyolefins (other than the first polymer) and the like. This further material is different from the amorphous polymer and from the second aliphatic material. This further material may be used to improve tack, improve yield strength, improve temperature stability, lower the Tg and the like.

In one preferred embodiment, the amount of unsaturation in these polymers or oligomers is about 4 mol % or lower as too high amounts of olefinic unsaturation may cause a decrease in stability. Further, the polymers or oligomers preferably do not comprise substantial amounts of aromatic groups, like about 4 mol % or less.

The polymeric or oligomeric compound is a different compound than the amorphous polyolefin in the adhesive compound. In one preferred embodiment, the polymeric compound has a higher molecular weight than the polymer used as amorphous (co)polymer. In another preferred embodiment, the polymeric or oligomeric compound is used to increase the tackiness of the compound and it has a lower molecular weight than the amorphous (co)polymer.

The polymeric and/or oligomeric compounds are distinguished from the second aliphatic material by their higher viscosity and/or softening points (measured as R&B softening point).

In a preferred embodiment, optionally hydrogenated star polymers are used, based on polypropene, polybutene, and/or copolymers with some ethane. Preferred are star polymers comprising polypropylene chains on a nucleus. Suitable star polymers include Kraton G1750 (hydrogenated amorphous polypropene star polymer). Kration G 1750 is amorphous with a Tg of −50 C, and due to its 3 dimensional shape (a star shape with a nucleus) it creates temperature stability.

Suitable polymers and oligomers include natural rubber, butyl rubber as well as bromobutyl and chlorobutyl rubber, SBS, SEBS, SEPS, SIS rubbers and hydrogenated versions thereof, (e.g, Kraton® or Vector grades), polyisobutylene polymers (e.g. Opanol® BASF or Indopol® polymers of INEOS), fully hydrogenated aliphatic and/or cycloaliphatic hydrocarbon resins (e.g. Escorez® 1304, Escorez® 5380 or Regalite® R1090), Keltan® EPDM or EPM rubbers, or Vistalon® polymers from Exxon Chemicals, such as for example Vistalon® 404 or 805 and the like.

The Mooney viscosities of non crosslinked rubbers (ML 1+8, 125° C.) suitable for the compositions may vary, and can be about 100 or less, and are preferably about 80 or less. Suitable Mooney viscosities (ML 1+8, 125° C.) may be 10 or more, and more preferably between 20 and 70.

In another embodiment, a suitable rubber is Kalene® 800 or 1300 from Royal elastomers (which are poly(isobutylene-isoprene) polymers with a Tg of about −70° C.).

R&B softening points of tackifying hydrocarbon resins suitable for the compositions may vary, and can be about 150° C. or less, and is preferably about 120° C. or less. Suitable R&B softening points may be 60° C. or more, and more preferably between 80° C. and 115° C.

The amount of this polymeric or oligomeric compound—if present—preferably is present in an amount of about 1 wt % or more, preferably about 2 wt % or more relative to the organic phase. Generally, the amount will be about 40 wt % or less with respect to the organic phase, preferably about 30 wt % or less and even more preferred about 25 wt % or less. The amount can be in a range consisting of any combination of the values stated. Suitable amounts have been shown to be e.g. 5 wt %, 9 wt % and 14 wt %.

Generally, the incorporation of so-called crystallinic polyolefins is less desirable, as they tend to decrease the tack. Such (actually semi-) crystallinic polymers can be polyethylene, isotactic polypropylene and the like. Hence, preferable, the amount of such semi-crystalline polymers is less than 5 wt %, preferably less than 3 wt % relative to the total composition, and such polymers are most preferably not present.

The inorganic phase of the polyolefin based adhesive comprises inorganic filler material as major component. The filler material influences the rheological behavior.

Suitable filler materials are inorganic minerals, salts, oxides and carbon black. Suitable examples include calcium carbonate, silicon oxide, alumina oxide (which may be in the form of an alumina trihydrate), titanium dioxide, boron sulphate and (ground) quartz, sand, talc, slate, and bentonite. A preferred filler material is calcium carbonate.

Suitable filler materials will have an average particle size of about 50 µm or lower, preferably of 10 µm or lower, and even more preferred about 5 µm or lower. Generally, the average particle size will be about 0.1 µm or more, preferably, about 0.4 µm or more.

The particle size can be measured with laser scattering.

Suitable filler materials may have one particle size and a homogeneous particle size distribution, or may have two or more particle sizes and two or more particle size distributions. Very suitable products may have a particle size distribution such that all particles have a size of about 50 µm or less, more preferably about 10 µm or less, and such that at least 60% of the particles has a size of 0.1 µm or more, preferably, at least about 60 wt % has a size of 0.4 µm or more. In a particular preferred embodiment, at least about 80 wt % of the particles has a size of about 0.6 µm or more.

The filler material preferably is treated to enhance its ability to stably mix with a-polar materials. Generally, filler materials are made more hydrophobic by surface treatment, for example with fatty acids, fatty alcohols and the like.

Suitable filler materials have a low solubility in water or preferably about 0.05 g/l or less.

The amount of filler in the inorganic phase generally will be about 80 wt % or more, preferably about 90 wt % or more, and even more preferably about 95 wt % or more.

Suitable filler materials include, but are not limited to Omyalite® 95T, Omyacarb® FT-FL, Omyalite® 90T, Hydrocarb® 95T, Hydrocarb® OG, several Microdol® and Finntalc® grades, Micaflor® MF8, Micaflor® MF10, Micaflor® MF25, Mistron® talc, Talkron® PR-10, Minex 10, Silverbond or other quartz types of Sibelco.

Other materials in the inorganic phase can be colorants, brightener and the like. Many pigments are inorganic crystalline or amorphous materials. It is preferred that the coating comprises a minor amount of colorant, such as for example about 5 wt % or less, more preferably about 3 wt % or less and maybe even about 1 or 0.5 wt % or less relative to the inorganic phase. The pigment may be surface treated or thoroughly dispersed in an appropriate liquid to enhance its ability to stably mix with aliphatic materials. Suitable colors include yellow (e.g, goethite, zinc ferrite), green (e.g., chrome(III)oxide), brown or black (e.g., magnetite, manganese ferrite), blue and red (e.g., hematite) or suitable mixtures thereof and additional materials, such as optical brighteners (e. g. titanium dioxide) and the like.

The main components of the polyolefin based adhesive (amorphous polyolefin, second aliphatic compound and inorganic filler) preferably make up about 70 wt % of the compound, preferably about 80 wt % or more, and more preferably about 90 wt % or more and even more preferable, about 95 wt % or more.

Depending on the required rheological behavior, amounts of the components can be adjusted.

The relative weight amount of organic to inorganic phase generally will be between about 10/90 to 85/15. Preferably, about 20 wt % or more organic phase will be present, preferably about 25 wt % or more. Preferably, the amount of the organic phase will be about 70 wt % or less, preferably about 60 wt % or less. Hence, preferably, the amount of inorganic phase is about 30 wt % or more, more preferably about 40 wt % or more. Sufficient amount of inorganic material aids in achieving good rheological behavior and stability.

The amount of amorphous polyolefin to second aliphatic material may vary in certain limits depending on the required characteristic of the ultimate product and is generally within the range of 95/5 to 10/90. For example, a stable well performing anti-corrosive coating was obtained with a 70/30 mixture of PEPP copolymer and Vaseline. In a 30/70 mixture of these components, a paste type of material was obtained with good fluid and sticky properties. Hence, the amount of polymer relative to the amount of second aliphatic component preferably is about 10 wt % or more, preferably about 20 wt % or more. The amount of polymer generally is about 95 wt % or less, preferably about 90 wt % or less and even more preferred about 80 wt % or less.

In one embodiment of the invention, the organic phase comprises an amount of amorphous (co)polymer of between about 50-85 wt % and an amount of second aliphatic material of between about 13-40 wt %. The composition preferably comprises an amount of antioxidant of about 0.1 wt % or more. In this embodiment the amount of organic phase is about 25 to 65, preferably about 25-55 wt % and the amount of inorganic phase is about 35-75, preferably about 45-75 wt %. This composition is very suitable for use as anti-corrosive polyolefin based adhesive. The amount of amorphous (co)polymer preferably is about 15 wt % to 45 wt % with respect to the total composition.

In another preferred embodiment of the invention, the organic phase comprises an amount of amorphous copolymer of between about 20-50 wt %, the amount of second aliphatic material is between about 77-40 wt %. In this embodiment the amount of organic phase is about 35-75 wt % and the amount of inorganic phase is 25-65 wt %. This composition is very suitable for use as paste with excellent tackifying characteristics, combined with anti-corrosive and stability characteristics. Hence, it is very suitable as polyolefin based adhesive in case a slightly softer adhesive layer is required.

The polyolefin based adhesive can be made by mixing the several components in a kneader, mixer, extruder or the like. In one embodiment of the invention, it is preferred to mix the components in a kneader under reduced pressure to preclude air entrapment in the composition. However, it is also possible to knead at atmospheric pressure. Kneading will cause the temperature to rise.

Preferably the components are mixed at room temperature, and kneaded, where the temperature generally reaches about 50° C. or higher, more preferably about 70° C. or higher. It is preferred to perform the kneading at a temperature of about 170° C. or lower, preferably about 140° C. or lower, and most preferably about 130° C. or lower. Mixing at higher temperatures like at about 180° C. is possible, but may require more anti-oxidants to keep stability.

The polyolefin based adhesive can be made directly in an extruder to be extruded on pipes. It is also possible, to extrude the mixture into flakes in plastic bags. Preferably, such flakes are kept in a cool storage (less than 20° C.) to preclude difficult handling.

The polyolefin based adhesive can also be applied as a two-sided-tacky tape. Tapes suitable in the present invention are generally made by extrusion and calendring the adhesive on a two-sided non-adherent film. Preferably, the adhesive is provided with a net. When such adhesive tape is applied to a metal pipe, the adhesive is sticking to the metal pipe, and the tacky other side is available to contact the PE or PP layer that will be provided thereafter.

The PE or PP Layer

The polyethylene or polypropylene layer provided on the adhesive layer is the first protective layer for the metal pipe to protect against physical impact. The polyethylene or polypropylene layer is a continuous layer along the pipe sections where the polymers are applied. The PE or PP coating is a continuous layer, which means that—on the section where the coating is applied—the PE or PP coating is heat-fusion bonded to itself. This polyolefin coating imparts mechanical strength to the coating system, and therefore it is an advantage of the present invention that the mechanical properties are optimal because of the heat-fused polyolefin layer. This is different from polymer tapes that are known, for example as shrink tapes, as these are not molten and therefore do not fully fuse. Preferably, the PE or PP layer is applied with extrusion in the molten state, and—also with side extrusion—the overlapping bands of polymer are molten at the moment of application, and therefore fuse together. Equally, PE or PP heated tapes may be used, as long as on application the tapes fuse together. Such fully bonded PE or PP has substantially higher shear strength than adhesive bonded polyolefin layers.

The PE or PP layer does not shrink on heating, but shrinks on cooling after its application. Such shrink is substantially less than the shrink shown by heat-shrinkable sleeves. The extrudable PE or PP is not crosslinked, in contrast to shrink sleeves, which generally are made from cross-linked polyethylene or cross-linked polypropylene.

Suitable polyethylenes include high-density polyethylene (HDPE) and medium-density polyethylene (MDPE), wherein the polyethylene has a weight average molecular weight of over 50.000 g/mol. They are selected from the group of homopolymers of ethylene and copolymers of ethylene with one or more alpha-olefins having from 4 to 10 carbon atoms, preferably 1-butene or 1-hexene. Examples of suitable polyethylenes are those having a multimodal molecular weight distribution and comprising a low molecular weight ethylene homo- or copolymer component and a high molecular weight copolymer component being a copolymer of ethylene and at least one alpha-olefin having from 4 to 10 carbon atoms, such as 1-butene or 1-hexene. Such polymers are suitably produced in multi-step polymerization processes, typically employing cascaded polymerization reactors. Such polyethylenes are disclosed, among others, in WO-A-97/03139, WO-A-2004/067654, EP-A-1865037 and EP-A-2072587. The PE may be a reactive PE, allowing the PE to react with an epoxy coating. This is particularly useful when the coating system of the present invention is used in field joints, with pipes coated with factory-applied epoxy coatings.

Such polyethylene typically has a melt flow rate $MFR_5$, measured at 190° C. under a load of 5 kg according to ISO1133 of from 0.3 to 6.0 g/10 min, preferably from 0.3 to 3.0 g/10 min, and a density measured according to ISO 1183-1:2004 Method A on compression moulded specimen prepared according to EN ISO 1872-2 (February 2007) of from 930 to 955 kg/m$^3$, preferably from 935 to 950 kg/m$^3$, such as 940 to 950 kg/m$^3$.

Suitable polypropylenes include isotactic and syndiotactic homopolymers of propylene and copolymers of propylene with at least one comonomer selected from ethylene and alpha-olefins having from 4 to 10 carbon atoms, wherein the polypropylene optionally includes an elastomeric component. Examples of suitable polypropylenes are disclosed, among others, in WO-A-03/087205, EP-A-1801146, EP-A-1260547 and EP-A-1174261. The PP may be a reactive PP, allowing the PP to react with an epoxy coating. This is particularly useful when the coating system of the present invention is used in field joints, with pipes coated with factory-applied epoxy coatings.

Such polypropylene typically has a melt flow rate $MFR_2$, measured at 230° C. under a load of 2.16 kg according to ISO1133 of from 0.05 to 30 g/10 min, preferably from 0.2 to 10 g/10 min. Such polypropylene may be a homopolymer of propylene or a copolymer of propylene with at least one comonomer selected from ethylene and alpha-olefins having from 4 to 10 carbon atoms. If the polypropylene is a copolymer then the content of the comonomer(s) in the polypropylene is typically from 0.1 to 20% by weight.

Generally, the PE or PP contains stabilizers, pigments and/or fillers.

One of the standard coating colors is black, and carbon black is the most used colorant/filler for PE coatings. The amount of carbon black generally is between 0.5 and 5 wt %, and more preferable between 1.5 and 3.0 wt %. Another standard color is white, in particular for PP coatings, and titaniumdioxide is commonly applied as white colorant/filler. Other suitable white fillers/colorants include finely dispersed quartz, gypsum and the like.

As stabilizers, the stabilizers can be used that are described for the polyolefin based adhesive.

The adhesion between the polyolefin based adhesive and the PE or PP generally is very good, and no additional adhesion promoting layer (also called compatibilizing layer) is necessary. However, it is possible to apply an intermediate layer to increase the mutual adhesion. A suitable intermediate layer comprises an acid or acid derivative grafted copolymer of ethylene or propylene, together with an elastomer.

The characteristics of the polyolefin coating conform with ISO21809-1 raw materials for top coatings.

Processing

Factory Coating

In a first embodiment, the present invention is used for so-called "industrial coated pipes", or "factory coating". In general, in this embodiment, the metal pipes are provided over the entire length with the coating system of the present invention. Only the outer ends may be kept uncoated, because a coating on such end would be damaged by welding consecutive pipe-ends. Preferably, before applying the coating system, the metal pipes are sand blasted or cleaned in another way to provide metal pipes with a cleanliness in accordance with ISO 8501-1 (or ISO 21809-3). Thereafter, the adhesive is extruded on the metal pipe in a thickness of about 0.5-5 mm, preferably about 2 mm or less, and even more preferably about 1.5 mm or less. Next, the PE or PP layer is extruded over the adhesive layer.

The polyolefin based adhesive preferably is extruded on the metal pipes, although double-sided-tacky tapes can be used as well. Although a wide range of thicknesses id possible, it is preferred—for normal use pipes—to have a coating of about 1-5 mm thickness, preferably 2-4 mm.

In order to achieve a continuous layer, the PE or PP coating preferably is extruded over the pipe section where the coating system of the present invention is applied. However, it is also possible to apply heated tapes that are wound over the pipe according to ISO NORM 21809-3, -5B or -5E.

On the molten or still sufficiently soft polyolefin layer, polyolefin particles of a few mm or smaller can be applied like for example described in EP319456 or WO02/081105. In this way, the outside of the coating is roughened, allowing easier handling.

It is a substantial advantage, that with applying the coating system according the invention, it is not necessary to heat the metal pipe. In practice, the pipes are heated by induction, normally to a temperature ranging from 150 to 220° C., to cure the epoxy resin that is applied as first coating layer. It may however be advantageous to slightly warm the pipe to a temperature of 50° C. or less, like for example 40° C. or 35° C., to ascertain that the surface of the pipe is dry. Preferably, the pipe is heated—if necessary—to a temperature of about 3° C. or more above the dew point on the site.

Apart from the advantage of not having to heat the metal pipe, the present invention has the advantage that the adhesive layer is slightly fluid under pressure. The extruded polyethylene or polypropylene will shrink upon solidification and cooling, and will exert some pressure on the polyolefin based adhesive. Because of this pressure, adhesion is secured, and slight defects will become healed by the adhesive. This also has as advantage that defects that occur later during transport or installation are also healed by the adhesive, because of it being slightly fluid under pressure. This is a distinct advantage over the epoxy coating, because if an epoxy coating is damaged, it will not be repaired automatically.

ISO 21809-1 describes plant applied coatings, and the test methods described in that ISO standard can be used to test the coating system of the present invention, as far as not described elsewhere. Due to the novelty of the invention, there is not yet a clause in ISO21809 series of standards that covers the use of the described invention as the low viscosity, amorphous, non-crystalline adhesive compound is not recognized yet in the ISO 21089 series of standards as a first adhesive layer. ISO 21809-3 describes the protection of field joints and section 13 covers the use of a low viscosity, amorphous, non-crystalline adhesive compound as a first adhesive layer. The present invention can be used for the protection of field joints as described. The second layer is described in the ISO21809-3 as a polymeric tape, but the coating system of the present invention complies with the standard as far as test values are concerned, with an increased shear strength because of the continuous PE or PP layer:

No cathodic disbondment according to ISO 21809-3, Annex G, at 23° C. and $T_{max}$, according to Annex G No holiday at max 25 kV according to ISO 21809-3, Annex C.

Cohesive fracture during peel tests (to steel and plant coating) according to ISO21809-3, Annex H, leaving 95% of the surface covered at 23 C and $T_{max}$.

The coating leaves a film on the substrate during the adhesion test at 23 C and there is no evidence of adhesive failure, according to Annex M and Annex I.

Impact resistance>15 J at 23 C, according to Annex D

Cohesive failure>0.02 N at 23 C and 0.002 N/mm$^2$ when tested at $T_{max}$, according to Annex J Indentation>10 N/mm$^2$ when tested at 23 C and $T_{max}$, according to Annex E Specific for PE coatings: the system of the present invention provides a weathering resistance (excellent UV and thermal ageing) according to ISO 21809-1, Class B.

The carbon black dispersion according ISO 18553 preferably has a rating of about 3.0 or lower.

Preferably, the compound-density of the PE material according to ISO 1183 is about 945 kg/m$^3$ or higher The brittleness temperature according to ASTM D746 is lower than minus 80° C.

Specific for the PP coatings: the system of the present invention provides material with high thermal ageing properties according to ISO 21809-1, Class C, with an oxidation induction time at 220° C. according to ISO 11357, about 30 min or more A Shore D Hardness at 23° C. according to ISO 868 of about 60 or more and A tensile stress at yield at 23° C. according to ISO 527 of about 20 or higher.

The optionally roughened PE or PP coated pipe can be used as is. For certain applications, further layers are provided on the PE or PP coating, like cement/concrete layers, foamed polyurethane layers or the like. The coating system of the present invention provides a very good corrosion and physical protection, and any further layer can be used as deemed appropriate.

Field Joint Coating

In a second embodiment, which may be combined with the first embodiment, the process is applied at the bare sections of coated pipes that are installed in the field. The field joints may be coated on-shore, while pipes are constructed on land, or offshore, when pipes are prepared on a barge. Such coated pipes may be any standard coated pipe, but would be preferably a pipe coated with the system according to the present invention.

While installing a pipe-line, sections of metal pipes are welded together, and the end sections of the pipe (the cut-back portions of the pipes) need to be (re)coated, as the original coating—if present—will have been removed because of damage of the welding process to connect two pipes.

In the process according the invention, the bare pipe sections are preferably sand-blasted, and are thereafter provided with the polyolefin based adhesive, and thereafter by a polyethylene or polypropylene coating. Also in this case, the solidification of the PE or PP coating layer, and further cooling, will exert pressure to the polyolefin based adhesive. A very tight, strong and self-healing protective layer is provided in this way.

The polyolefin based adhesive can be applied by extrusion, or by applying a tape.

Conventional adhesive tapes like those sold under the Viscotaq® or Stopaq® trade name, comprise the 2-4 mm of an adhesive, extruded and calendered to an adherent plastic film (e.g. PET or PP film of 0.05-0.5 mm thickness, and provided with a non-adherent (siliconized) film on the other side. Often, the adhesive is calendered into a net of e.g. nylon of polyester threads. Upon application, the non-adhering film is removed, and the tacky side is pressed onto a metal pipe, with the adherent plastic film on the outside. The plastic film which remains on the outside allows handling of the treated pipe.

Tapes suitable in the present invention are generally made by extrusion and calendring the adhesive in a net, while using a two-sided-non-adherent film. When such adhesive is applied to a metal pipe, the adhesive is sticking to the metal pipe, and the tacky other side is made available after removal of the 2-sided-non-adherent film to contact the PE or PP layer that will be provided thereafter. It is also possible to apply just the adhesive, without utilizing a net.

In protecting field joints with the coating system according to the present invention, it is preferred to have the coating system applied in a thickness that is comparable to the thickness of the factory coating. To achieve this, it is preferred to use an adhesive tape with a thickness of between about 0.5 and 1.6 mm, preferably between about 0.8 and 1.3 mm. An adhesive tape will be applied with some overlap, which may be up to 50%. The largest part of a field joint will preferably be provided with a double layer of adhesive tape. The PE or PP layer can be extruded or hot-laid over the adhesive.

The PE or PP coating is extruded over the adhesive, and generally also over a relatively small part of the factory coating (e.g. 2-5 cm overlap on each side). In order to achieve good bonding between the factory applied coating and the PE or PP coating, the small section of the factory coating is heated to for example about 160° C., to allow hot fusion bonding, resulting in a virtually continuous coating. Heating of the factory-applied coating can be done with locally targeted hot air, or infra-red heaters. Extrusion can be done with a WehoCoat™ coating machine, adopted to the current process. Hence, heating of the pipe for melting and curing an epoxy coating is not necessary; only some local heating to allow proper bonding of the PE or PP layer is preferred.

Extrusion

Conventional extruders for melting the polyolefin based adhesive, and/or the PE or PP coating can be used in the process according the invention. The adhesive generally can be extruded at temperatures around 150-170° C. The PE coating is generally extruded at temperatures around 180-200° C., and the PP coating is generally extruded at temperatures around 190-220° C.

The two main types of coating application on metal pipes are side extrusion and cross-head extrusion. With side extrusion pipes rotate while the adhesive or coating is wrapped around the pipe. By cross-head extrusion the pipe does not rotate and coating is 'pulled' as a sleeve around the pipe.

The polyolefin coated steel pipes can be produced by side extrusion on a rotating steel pipe. The steel pipe under rotation, successively is melt coated by independent coating extruders having flat film dies for the polyolefin based adhesive, and for the PE or PP coating layer and the optional intermediate layers of the adhesion promoting or compatibilizing agent.

Extrusion from a die perpendicular to a steel pipe is common, but it is said to may have a disadvantage of reduced quality if the overlapping sections of the coatings are not fully integrated or fused. With the system of the present invention, any small defect will be healed by the polyolefin based adhesive. Therefore, coating from flat film dies is perfectly possible with the system of the present invention.

In particular with smaller diameter pipes, crosshead die pipe coating may be preferable. In this embodiment, the polyolefin coated steel pipes can be produced by crosshead die pipe coating technology, preferably a cross-head fed by extruders, for the inner polyolefin based adhesive layer, and optional for the compatibilizing agent and for the PE or PP coating material. The extruder feeding the die of the crosshead in the PE or PP steel pipe coating line has a temperature profile ranging from 175 to 250° C.

In the second embodiment of the invention, the polyolefin based adhesive and PE or PP coating is applied in the field with a field joint coating machine. For example, a field joint coating machine will comprise an injection molding machine which melts the adhesive in one extruder, and the PP or PE in another extruder. Thereafter, the molten material is extruded on the metal pipe. In this case, the pipe cannot rotate, and the die-part of the machine is able to rotate at least partially, or close-in, around the pipe. A suitable extrusion technique applicable for field joints is the WehoCoat™ coating technology of Borealis and Upanor.

In offshore field joint coating, the application of the polyolefin based adhesive and the application of the PE or PP coating may take place in separate stations, each taking between 3 to 10 min, preferably about 4-8 min, and most preferably less than 6 min per applied layer. The application of the polyolefin based adhesive preferably is automated, and can be either an application of a tape, as described above, or an application via extrusion.

Applications

The pipes coated with the polyolefin coating system according to the present invention are suitably used in the oil and gas industry, but also for transporting water. Pipes coated with a PE coating generally are used at temperatures between about −40 to +85° C. Pipes coated with a PP coating generally are used at temperatures between about −20 to +110° C.

Pipes coated with the polyolefin coating system according to the present invention conform with important industry standards, such as for example more than 5000 hr stable at design temperature according to ASTM D1693 (under aggressive soil conditions; condition B: F0) for a pipe with a polyolefin coating system of the present invention with a PE coating, and ASTM D1693-08, Cond A: F0) for one with a PP coating.

The polyolefin coating system of the present invention conforms with important anti-corrosion standards, such as no cathodic disbondment according to ISO 21809-3, 2008 at 50° C. for 28 days with a measured voltage at the reference electrode of −1500 mV (Calomel electrode), showing self-healing properties. For standard 3 layer PE and PP coatings, one can find disbondment values of up to 10 mm according to ISO 21809-3:2008. This improvement by the coating system according the present invention is a result of a.o. the self healing capability of the adhesive. This is an advantage not only when damages occur but also at the pipe ends to already create a water tight seal during storage. With conventional 3 layer systems comprising epoxy coated pipes, the pipe ends (where the coating is stripped for the welding in the field) can have ingress of moisture, whereas with the coating system of the present invention this is not the case due to the bleeding effect of the adhesive. Furthermore, shielding should not be a concern because of the adhesion principles in conjunction with one continuous layer of coating that stays in a sticky semi solid state.

The system shows excellent physical properties (testing methods according to ISO 21809-3:2008), such as:

No delamination and cohesive fracture (leaving a film of adhesive on the substrate) of the inner layer on heat aging (60° C. for 100 days);

Peel strength of the outer layer from the substrate: more than 0.2 N/mm at room temperature (leaving a film of adhesive on the substrate, and showing cohesive failure), see also the photographs of FIG. 1.

The dielectric strength is more than 5 kV per mm coating, with the total system having a dielectric strength of more than 25 kV (with a minimum coating thickness of 3 mm)

Impact strength at room temperature higher than 30 J

Indentation resistance: more than 1 $kg/mm^2$ at room temperature and at 60° C.

Specific for PE coatings, the system of the present invention provides a weathering resistance (excellent UV and thermal ageing) according to ISO 21809-1, Class B. The carbon black dispersion according ISO 18553 preferably has a rating of about 3.0 or lower. Preferably, the compound-density of the PE material according to ISO 1183 is about 945 $kg/m^3$ or higher, and the brittleness temperature according to ASTM D746 is lower than minus 80° C.

Specific for the PP coatings, the system of the present invention provides material with high thermal ageing properties according to ISO 21809-1, Class C, with an oxidation Induction Time at 220° C. according to ISO 11357, about 30 min or more, a Shore D Hardness at 23° C. according to ISO 868 of about 60 or more and a tensile stress at yield at 23° C. according to ISO 527 of about 20 or higher.

The polyolefin coating system according to the present invention exhibits as a combination of a self-healing anti-corrosion layer and an inert, tough coating layer, well bonded through the polyolefin based adhesive to the metal pipe, excellent properties. The excellent properties regard (i) bonding to the metal pipe including prevention of disbondment of either the adhesive or the PE or PP coating layer, and thereby keeping the excellent anti-corrosion and physical protective properties, (ii) excellent strengths characteristics, thereby protecting the metal pipe from damage both during fabrication and during use, and (iii) excellent corrosion protection because of the inertness of both the adhesive and the PE or PP coating. The long term robustness of the system is thought to be caused by the combination of the self-healing and anti-corrosive properties of the adhesive, with the inertness and strength of the PE or PP coating. This optimal combination of properties, is obtained thanks to the flawless binding between the adhesive, the metal pipe and the PE or PP coating. This bonding is robust, as minor damage during transportation or other handling is not detrimental to efficacy of the protection by the polyolefin coating system.

The invention will be elucidated with the following non-limiting examples.

Example 1

In a kneader, an organic phase consisting of 29.1 wt % polypropylene (polytac R-500), 11.2 wt % polybutene (Indopol H-300) and 0.1 wt % coloring material and 59.6 wt % $CaCO_3$ (Omyalite), was added (40.4 wt % organic phase, 59.6 wt % filler) and the materials were mixed. The materials were mixed for a total time of about 2 hr with a highest temperature of about 70° C. A homogeneous adhesive compound was obtained.

The yield point at 71° C.—measured with an AT instruments as described above, using a gap of 4 mm—was higher than 1%; the high temperature characteristics of this compound were excellent. The tack at room temperature was good, the compound showed cohesive failure.

The adhesive compound was extruded on 20 cm of a lightly sand-blasted, rusty steel pipe, and a polyethylene film was pressed as outer layer on the adhesive. The adhesive compound was firmly pressed with hand pressure to the pipe. For this small trial, a polyethylene film was used, and hand pressure, instead of an extruded PE sheet. After two days, the polyethylene film was peeled off; the adhesive showed cohesive failure, meaning that the adhesive kept covering the pipe.

Examples 2 and 3

In an analogous way to example 1, a compound was prepared from 47 wt % nepheline syenite (a sodium-potassium aluminasilicate; Minex 10)) as Example 2, and 47.83 wt % $Al(OH)_3.5H_2O$ as a filler as example 3, 33.98 wt % amorphous polyalfaolefine (Vestoplast 702, ethylene propylene copolymer), 18.14 wt % polybutene (Indopol H-300) and 0.05 wt % coloring material.

The yield point at 71° C.—measured with an AT instruments as described above, using a gap of 2 mm—was established at a shear strain higher than 0.5%; the high temperature characteristics of this compound were good, and the low temperature properties were improved with respect to the material of example 1. The tack at room temperature was very good, the compound showed cohesive failure when applied on a sand blasted clean metal sheet with a PP film used to press the adhesive to the metal sheet.

Example 4

The composition as described in Example 3 was made into preshaped 1 kg blocks and applied at about 40 degrees Celcius by side extrusion. A commercial available high duty high density polyethylene, suitable for pipe coatings was available in plastic bags. This HDPE had a carbon black content according to ISO 6964, of 2.0-2.6%, and the carbon black was dispersed according to ISO 18553, with a rating below 3.0.

The composition as described in Example 3 was fed into a wide mouth (large hopper) rubber compound extruder with a flat coating dye and applied by side extrusion as the first coating layer at about 40 degrees Celcius on a 4 inch rotating and forward moving pipe. A second extruder applied the molten high density polyethylene by injecting into a flat coating die for side extrusion on the same rotating forward moving pipe of 10 cm (4 inch) diameter as the second layer. The two-layer coating system was of very good quality.

A part of the polyethylene coating was cut and bend away from the pipe (as is visible on the photographs). The adhesive showed cohesive failure, i.e. adhesive remained both on the metal pipe, and on the polyethylene sheet, showing that the adhesion was very good to these substrates.

To test the self-healing properties, two 6 mm diameter holes were made through the PE and adhesive layer with a drill and the metal layer initially was visible. The next day, the holes appeared to be covered with the adhesive, and the pipe was protected against corrosion. Pictures of the damaged coating, and the self-healed coating are shown as FIGS. 1A and 1B.

The properties of the PE coated pipe were as follows:

The oxidation induction time (OIT) at 210° C. according to ISO 11357-6 was higher than 30 min, the tensile stress at yield according to ISO 527-2 (on Type 1 specimens with 50 mm/min) was higher than 15 MPa. The tensile elongation at break at minus 45° C. was more than 100%, according to ISO527-2. The environmental stress cracking resistance according to ASTM D1693, Condition B: F0 higher than 5000 hrs. The UV resistance according to ISO 21809-1 (7 GJ/m2 radiation) showed a delta-MFR of less than 35%. The thermal ageing resistance according ISO 21809-1 (100° C./4800 hrs) showed a delta-MFR of less than 35%. The indentation resistance according ISO 21809-1 is less than 0.2 mm at 23° C., and less than 0.4 mm at 80° C. The impact strength at 23° C. and at +60° C. is higher than 7 J/mm, according to ISO21809-1, Annex E.

The coating system showed no cathodic disbondment according to the method described in ISO 21809-3:2008 at 50° C. with an voltage of −1500 mV at the reference electrode (calomel electrode) for 28 days and showed self-healing properties. The dielectric strength of the total system passed the test of more than 25 kV.

Example 5

In an analogous way to example 1, a compound was prepared from 190 kg (51.0 wt %) Minex 10®, Sibelco, filler; 2.5 kg coloring material (blue; 0.7 wt %); 56 kg (15.0 wt %) Vestoplast 702 (amorphous polyalfaolefine), 90 kg (24.2 wt %) Indopol H300 (polybutene) and 34 kg (9.1 wt %) Kraton G1750 (hydrogenated amorphous polypropene star polymer). The adhesive could be applied as in Example 4, and showed the same good properties.

Example 6

A tape was prepared by applying the adhesive of example 4 to a double-faced anti-stick film of 10 cm width, and by calendaring a 10 cm wide polyester knit web (2×2 mm square openings) into the adhesive. The adhesive layer, with the web in it, was about 1 mm thick. The tape could be rolled on a bobbin.

A metal pipe was prepared by cutting back an epoxy factory coating over 30 cm. The adhesive tape was applied, precisely along the cut-back edge, and further on the remainder of the bare section of the pipe with about 50% overlap, while removing the double-faced anti-stick film. On the adhesive, and with an overlap of about 5 cm on the epoxy coating, a polyolefin layer was extruded with a Weho coating machine. The layer was about 5 mm thick in total. In order to achieve a good bonding between the PE and the epoxy, the outer 5 cm of the epoxy coating was heated to 160° C. by local hot air blowers.

Some major properties of the field joint, coated in this way are: The coating system showed no cathodic disbondment according to ISO 21809-3:2008 at 50° C. for 28 days with an voltage of −1500 mV measured at the reference electrode (calomel electrode), and showed self-healing properties. The dielectric strength of the total system passed the test of more than 25 kV. No delamination and cohesive fracture (leaving a film of adhesive on the substrate) of the inner layer on heat aging (60° C. for 100 days) was observed; peel strength of the outer layer from the substrate: more than 0.2 N/mm at room; impact strength at room temperature higher than 30 J; indentation resistance: more than 1 kg/mm² at room temperature and at 60° C.

The invention claimed is:

1. Metal pipe coated on at least a section of the metal pipe with an anti-corrosive polyolefin coating system around said metal pipe, wherein the metal pipe does not comprise an epoxy coating at the section where the anti-corrosive polyolefin coating system is present, the anti-corrosive polyolefin coating system comprising:
   a. a corrosion protective layer of a chromate, phosphate, borate, nitrite or molybdate in a thickness of between 2-200 nm;
   b. a polyolefin based adhesive in direct contact with the metal pipe and the corrosion protective layer;
   c. a PE or PP coating layer;
wherein the polyolefin based adhesive contains an organic phase consisting of substantially saturated hydrocarbons, and wherein the polyolefin based adhesive contains amorphous polypropylene, ethylene-propylene copolymers or poly(iso)butylene (co)polymers, said polyolefin based adhesive being flowable when a pressure of 10 kgf/mm² is applied,
wherein the PE or PP coating layer is a continuous layer over the section where the polyolefin based adhesive is present, and wherein said polyolefin based adhesive adheres to both the metal pipe and to said PE or PP coating layer, wherein the PE or PP coating layer consists substantially of HDPE, MDPE, LLDPE, LDPE or isotactic or syndiotactic PP, and wherein the polyolefin based adhesive is present in a thickness of between 0.5 and 5 mm, and the PE or PP coating layer is present in a thickness of between 1-10 mm.

2. Metal pipe according to claim 1, wherein the PE or PP coating layer consists substantially of reactive HDPE, MDPE, LLDPE, LDPE.

3. Metal pipe according to claim 1, wherein the PE or PP coating layer is a HDPE.

4. Metal pipe according to claim 1, wherein the PE or PP in the PE or PP coating layer is non-crosslinked.

5. Metal pipe according to claim 1, wherein the section of the metal pipe is a field joint.

6. Metal pipe according to claim 1, wherein the section of the metal pipe is substantially the whole pipe.

7. Coated metal pipe according to claim 1, wherein the coated metal pipe on the section where the anti-corrosive polyolefin coating system is applied, shows, according to methods described in ISO 21809-1 or -3:
   a. no cathodic disbondment at 50° C. for 28 days with a measured voltage at the reference electrode of −1500 mV, calomel electrode, showing self-healing properties;
   b. no delamination and cohesive fracture, leaving a film of adhesive on the substrate, of the inner layer on heat aging at 60° C. for 100 days;
   c. a peel strength of the outer layer from the substrate of more than 0.2 N/mm at room temperature, leaving a film of adhesive on the substrate, and showing cohesive failure;
   d. a dielectric strength of more than 5 kV per mm coating, with the total system having a dielectric strength of more than 25 kV with a minimum coating thickness of 3 mm;
   e. an impact strength at room temperature higher than 30 J;
   f. an indentation resistance of more than 1 kg/mm2 at room temperature and at 60° C.

8. Coated metal pipe according to claim 1, wherein the anti-corrosive polyolefin coating system is more than 5000 hr stable at design temperature according to ASTM D1693, under aggressive soil conditions; condition B: F0 for a pipe with a polyolefin coating system of the present invention with a PE coating, and ASTM D1693-08, Cond A: F0 for one with a PP coating.

* * * * *